United States Patent Office 3,157,959
Patented Nov. 24, 1964

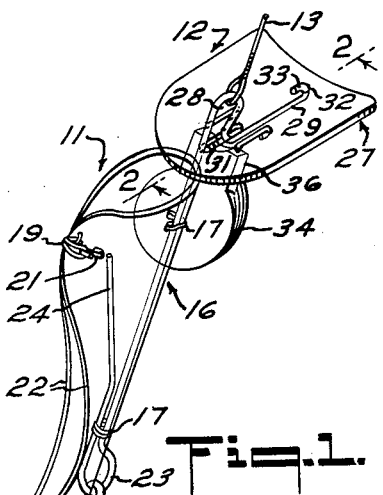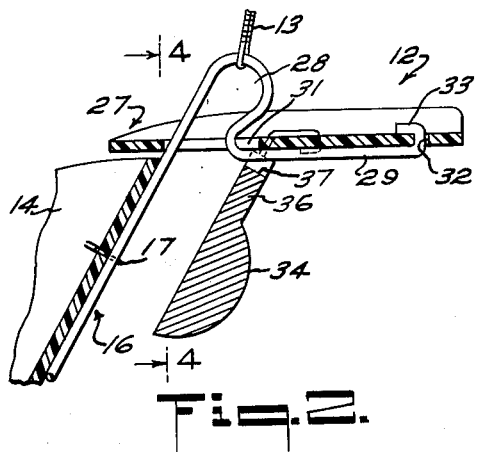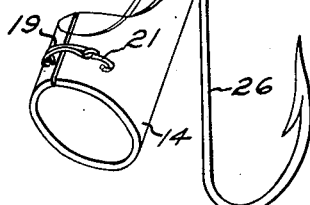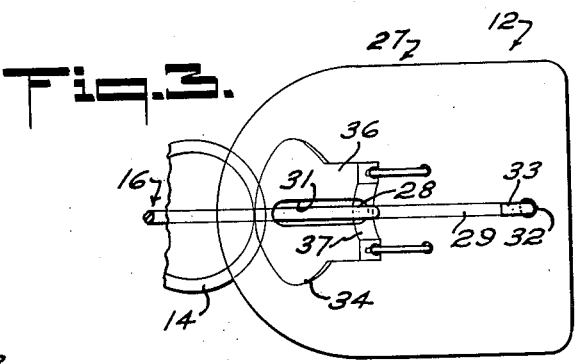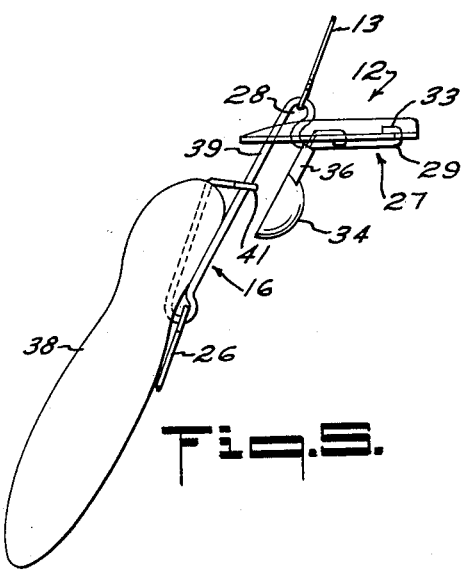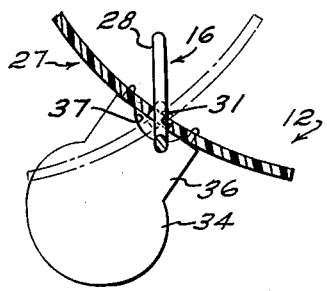

3,157,959
FISH LURES WITH SINUOUS ACTION
Paul W. Anderson, 732 Central Ave., Alameda, Calif.
Filed Apr. 12, 1963, Ser. No. 272,623
3 Claims. (Cl. 43—42.03)

This invention relates generally to fish lures, and is more particularly directed to a head arrangement therefor which imparts a sinuous movement to the lure as it is pulled through the water to thereby render the lure lifelike in its actions.

A great variety of lures are employed by fishermen to entice the fish to bite. Of course, the more lifelike the lure appears to the fish, the more likely it is the fish will bite.

It is therefore an object of the invention to provide for substantial active motion of fish lures resembling that of live prey.

Another object of the invention is the provision of an improved head for fish lures which is arranged to impart sinuous motion to the lure as it is drawn through the water at the end of a line.

Still another and more specific object of the invention is the provision of a fishing lure head which features a counterweight rudder in swivelable connection with the frame of the lure proper, which rudder, upon being pulled through the water exhibits oscillatory motion and imparts the same to the lure to effect sinuous movement thereof.

It is a further object of the invention to provide a head of the class described which is simple and economical in construction and which may be incorporated in existing lures as well as in new lures during their manufacture.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a perspective view of a fish lure constructed in accordance with the present invention.

FIGURE 2 is an enlarged fragmentary sectional view of the lure taken on the line 2—2 of FIGURE 1.

FIGURE 3 is a top plan view of the head portion of the lure illustrated in FIGURE 2.

FIGURE 4 is a sectional view taken on the line 4—4 of FIGURE 2 but showing the various positions assumed by the head as the lure is pulled through the water.

FIGURE 5 is a side elevational view of a modified form of the lure.

Referring now to FIGURE 1 of the drawing, there will be seen to be provided a fish lure 11 having a head 12 which is arranged to impart a highly active sinuous movement to the lure as it is drawn through the water at the end of a line 13. The particular lure 11 is designed to carry any desired live-bait, such as minnows or the like, and by virtue of the novel head 12, the bait will undergo sinuous movements which render it very enticing to a fish. More particularly, the lure includes a blanket 14 of flexible, preferably transparent material, such as polyethylene sheet. A rigid rod frame 16 of wire or the like is secured, as by means of staples 17, to the blanket along its longitudinal center line. The blanket may accordingly be folded at its longitudinal center line and the opposite sides thereof brought together around a minnow or the like. The sides of the blanket may then be secured together to hold the bait, preferably by means of rubber bands 19 secured to one side of the blanket adjacent its opposite ends and selectively engageable with hooks 21 secured to the other side of the blanket. The opposite sides of the blanket are additionally advantageously provided with aligned cut-outs 22 in the longitudinal medial regions thereof so as to expose a substantial portion of the bait carried therein. To assist in retaining the bait within the blanket, the frame 16 is preferably folded over to form an eye 23 longitudinally centrally of the blanket, and the free end of the frame extended upwardly from the eye, as indicated at 24, to facilitate impaling of the bait on the frame. The eye 23 facilitates securance of a fish hook 26 to the frame.

Thus, a variety of live-bait may be conveniently and effectively carried by the blanket 14 and frame 16 of the lure. Of more importance, however, the lure undergoes life-like sinuous actions by virtue of the head 12, now described in detail. In this regard the head comprises a counterweighted rudder 27 in swivelable connection with the frame 16, which serves as the pivot axis of rudder movement. More particularly, the frame extends from the blanket 14 and is looped to form an eye 28 from which the free end of the frame extends in angular relation to the portion of the frame secured to the blanket. It is this angled end of the frame, indicated at 29, which serves as the pivot axis of the rudder. The rudder is generally rectangular in plan with a curved rear edge, and is transversely upwardly curved such that its upper face is concave and its lower face convex. The rudder is formed of substantially any desired lightweight structural material such as polyethylene, aluminum, or the like. The rudder is provided with a longitudinal slot 31 adjacent one end through which the eye 28 freely projects, the end portion 29 of the frame being thereby disposed subjacent the rudder. The rudder is further provided with a circular aperture 32 adjacent its other end and the end of frame portion 29 extend freely through the aperture and is right angularly bent susbtantially parallel to the rudder to define a journal hook 33. To facilitate counterweighting of the rudder, a counterweight 34 is secured to the underside thereof forwardly adjacent the slot 31. The weight is aligned with the longitudinal axis of the rudder and is provided with a shank portion 36 in attachment with the rudder. This shank portion has an arcuate notch 37 in its upper edge for free traversal by the frame portion 29. In addition, the shank is inclined rearwardly with respect to the rudder to substantially parallelism with the portion of the frame secured to the blanket. The counterweight is accordingly disposed a substantial distance rearwardly of the center of gravity of the rudder. With the line 13 secured to the eye 28, the weight hence drags the rear end of the rudder downward to thereby upwardly incline the rudder with respect to the horizontal. The rudder accordingly presents a substantial aspect to the water as it is pulled therethrough.

As the lure is pulled through the water, the drag and lift forces on the rudder due to its aspect and transverse curvature cause the rudder to swivel about the frame portion 29. The rudder swivels first in one direction and then in the opopsite direction, due to the action of the counterweight 34, to positions which are limited by the clearance between the eye 28 and edges of the slot 31 and the clearance between the journal hook 33 and the edge of the aperture 32. As shown in FIGURE 4 in full line position, the leading portion of the convex lower face of the rudder adjacent one side thereof presents a greater aspect to the water than the leading portion adjacent the other side, to thereby steer the rudder in the direction of the latter side. In the phantom line position, the situation is reversed and the rudder is steered in the opposite direction. Thus, as the lure is pulled through the water it is steered in alternately opposite directions by the rudder and undergoes a sinuous life-like motion.

The head 12 of the live-bait lure 11 previously described may as well be incorporated in existing lures to impart life-like motion thereto. For example, various molded soft plastic lures exist which are life-like replicas of cray fish, eels, tadpoles, etc., but which, despite their realistic appearance, do not exhibit life-life movements as they are pulled through the water. Accordingly, the head 12 may be advantageously incorporated therewith as depicted in FIGURE 5 for the case of an existing molded soft plastic tadpole lure 38. The rod frame 16 in the present instance includes a free end portion 39 which extends from eye 28 in angular relation to the pivot portion 29. End portion 39 is inserted into the lure 38 and looped back and fastened to itself, as indicated at 41, to thus secure the head to the lure.

What is claimed is:

1. A head for a fishing lure comprising a rigid rod frame having a first end portion adapted for attachment to a lure, a second end portion inclined with respect to the first end portion, and an eye interconnecting the first and second end portions, a transversely upwardly curved rudder having a longitudinal axial slot adjacent one end and an axially aligned aperture adjacent the other end, said eye projecting freely through said slot and the second end portion of said frame being subjacent said rudder with the end of said second portion having a hook extending freely through said aperture, and a counterweight having a shank secured to the underside of said rudder in alignment with its longitudinal axis and forwardly adjacent said slot, said shank having a notch traversed by said second portion of said frame.

2. A fishing lure comprising a rigid rod frame having first and second portions inclined with respect to each other, said first portion having a doubled over eye defining region for securance of a fish hook and a free end inclined from the eye, a blanket of flexible material secured at its longitudinal center line to said first portion of said frame with said free end extending through the blanket, rubber bands secured to one side of said blanket adjacent its opposite ends, hooks secured to the other side of said blanket adjacent its opposite ends for selective engagement by said rubber bands and a counterweighted transversely upwardly curved rudder swivelably connected to the second portion of said frame for pivotal movement about the axis of said second portion.

3. A head for a fishing lure comprising a rigid rod frame having first and second generally elongated portions inclined to each other and rigidly connected by an eye, said first portion adapted for attachment to a lure, said eye adapted for attachment of a line, a transversely upwardly curved rudder pivotally mounted on said second portion for movement only about the axis of said second portion, said rudder being concave upwardly symmetrically about its axis of pivotal movement and having a generally elongated linear cross section in planes parallel to said axis of pivotal movement, and a counterweight rigidly secured to the underside of said rudder at the longitudinal axis thereof and rearwardly of its center of gravity.

References Cited by the Examiner

UNITED STATES PATENTS

| | | | |
|---|---|---|---|
| 1,931,932 | 10/33 | Myers et al. | 43—42.49 XR |
| 2,463,369 | 3/49 | Finlay et al. | 43—44.4 |
| 2,559,542 | 7/51 | Mintner | 43—42.15 XR |
| 2,598,011 | 5/52 | Pitre | 43—44.4 XR |
| 2,886,914 | 5/59 | Lievense | 43—42.15 XR |

FOREIGN PATENTS 1,129,128  9/56  France.

ABRAHAM G. STONE, *Primary Examiner.*